3,226,181
COMPOSITION OF THE FORMULA $P_4N_2Cl_{14}$ AND PROCESS FOR PREPARING THE SAME
Margot Becke, Heidelberg, Germany, assignor to Olin Mathieson Chemical Corporation, a corporation of Virginia
No Drawing. Filed July 11, 1962, Ser. No. 209,267
4 Claims. (Cl. 23—14)

This invention relates to a novel composition of matter having the empirical formula $P_4N_2Cl_{14}$ and to methods of preparing it. The novel compound is believed to be trichlorophosphonitrido - dichlorophosphonitridotrichlorophosphinium hexachlorophosphate having the formula $$(Cl_3P:N.PCl_2:N.PCl_3)PCl_6$$

The novel compound is prepared according to the present invention by the reaction of ammonium chloride with $P_3NCl_{12}$ or $PCl_5$. When $P_3NCl_{12}$ is the reactant, it is prepared from ammonium chloride and $PCl_5$ in a known manner as described, for example, by M. Becke-Goehring, Z. angew. Chem. 73, 246 (1961) from $PCl_5$ and $NH_4Cl$ in nitrobenzene at 45 to 60° C.

In the present invention, using $P_3NCl_{12}$ as reactant, the process appears to be represented by the equation:

$$4P_3NCl_{12} + 2NH_4Cl \rightarrow 3P_4N_2Cl_{14} + 8HCl \quad (1)$$

In the form of the invention using $PCl_5$ and ammonium chloride as reactants, $P_3NCl_{12}$ is first formed:

$$3PCl_5 + NH_4Cl \rightarrow P_3NCl_{12} + 4HCl \quad (2)$$

with which is combined the process of (1). The summation may be represented:

$$4PCl_5 + 2NH_4Cl \rightarrow P_4N_2Cl_{14} + 8HCl \quad (3)$$

In the process of the invention, the phosphorus-halogen reactant is $P_3NCl_{12}$ in Equation 1 and $PCl_5$ in Equation 3. The ratio of the phosphorus-halogen reactant is critical in order to obtain the product of the invention and is preferably about 2:1 but this ratio may vary from about 1.9:1 to 2.5:1.

The preferred inert solvent for the reaction is symmetrical tetrachloroethane since it boils at 146° C. at atmospheric pressure which is a convenient reflux temperature for the reaction. However, other inert solvents which may be used include bromoform, nitrobenzene, and other inert solvents boiling above about 120° C. Preferably about 10 volumes of solvent are used per volume of reactants but this is not critical and may vary from a volume ratio of about 1:1 to 10:1 or more.

The method of the invention is carried out by heating the dissolved reactants to a temperature of about 80 to 180° C. preferably about 130 to 150° C. for several hours. The product is recovered by distilling off the solvent and crystallizing the residue.

$P_4N_2Cl_{14}$ is soluble in symmetrical tetrachloroethane, bromoform, phosphorus oxychloride, nitromethane, nitrobenzene and acetonitrile. It is slightly soluble in chloroform and insoluble in carbon tetrachloride, phosphorus trichloride or petroleum ether. $P_4N_2Cl_{14}$, similarly to $P_3NCl_{12}$ reacts vigorously with water, alcohols and amines.

$P_4N_2Cl_{14}$ has no definite melting point. Heated in a vacuum to 140 to 150° C., it sublimes, forming $P_3N_2Cl_9$ and $PCl_5$. Due to this decomposition, the melting point observed in an evacuated capillary tube ranges between 156 and 194° C. depending on conditions.

When the reaction product of $P_4N_2Cl_{14}$ with ammonia is heated, polymers are formed which are thermally very stable.

*Example I*

The $P_4N_2Cl_{14}$ was prepared in a one-liter flask fitted with a reflux condenser closed with a calcium chloride drying tube. To 600 milliliters of pure dry symmetrical tetrachloroethane was added 53.5 grams (0.1 mole) of $P_3NCl_{12}$ and 3.6 grams (0.066 mole) of finely powdered, dry ammonium chloride. The reaction mixture was heated to 130 to 150° C. The reaction started and hydrogen chloride was evolved. After 4 hours of heating the gas evolution ceased but the reaction mixture was heated for another two hours. The volume of the solution was reduced to about 300 milliliters by vacuum distillation and the undissolved material was separated. The thus obtained mother liquor was diluted by distilling 400 milliliters of carbon tetrachloride into the solution. After standing at 20° C. for 10 hours, about 36.5 grams of a crystalline precipitate separated. The mixture was filtered and washed with a mixture of tetrachloroethane and carbon tetrachloride. Finally the crystals were dissolved in about 60 milliliters of tetrachloroethane at 25° C. and filtered to remove undissolved material. By the addition of 140 milliliters of carbon tetrachloride, the crystals were reprecipitated. Re-solution and reprecipitation was carried out 3 times. In this way there was obtained a yield of about 14.6 grams of pure product. The yield of crude product was about 75 percent and is suitable for further preparations. The yield of reprecipitated product was about 30 percent based on the phosphorus introduced.

Analysis.—Calculated for $P_4N_2Cl_{14}$: N, 4.3; Cl, 76.6; P, 19.1. Found: N, 4.3; Cl, 76.4; P, 18.95.

The molecular weight was determined cryoscopically in nitrobenzene and found to be 309 compared with a calculated molecular weight of 649. Completely dissociated into two ions, the apparent molecular weight is 325.

*Example II*

$P_4N_2Cl_{14}$ was prepared directly from $PCl_5$ and ammonium chloride by heating a mixture of 83.5 grams of $PCl_5$, 11 grams of ammonium chloride and 600 milliliters of tetrachloroethane under the conditions described in Example I for 7 to 8 hours at 130 to 150° C. The solution was concentrated to 300 milliliters and the precipitate which formed was separated. It amounted to between 20 and 25 grams of $P_3NCl_{12}$. After the separation, $P_4N_2Cl_{14}$ was isolated from the mother liquor as described in Example I. The separated $P_3NCl_{12}$ is suitable for further preparation of $P_4N_2Cl_{14}$ as described in Example I.

What is claimed is:
1. A composition of matter having the formula

$$P_4N_2Cl_{14}$$

said $P_4N_2Cl_{14}$ prepared by the process of claim 2.
2. Process for preparing $P_4N_2Cl_{14}$ comprising heating $P_3NCl_{12}$ with $NH_4Cl$ in a molar ratio of from about 1.9:1 to 2.5:1 in an inert solvent at a temperature of 80 to 180° C. and separating $P_4N_2Cl_{14}$ from the resultant mixture.
3. Process of claim 2 in which the inert solvent is tetrachloroethane.
4. Process of claim 2 in which the $P_3NCl_{12}$ is formed in situ by heating $PCl_5$ and $NH_4Cl$ in the inert solvent.

References Cited by the Examiner

Becke-Goehring et al.: "Zeitschrift for Naturforschung," vol. 17b, No. 2, page 126 (February 1962).

Groeneveld et al.: "Journal of Inorganic and Nuclear Chemistry," vol. 8, page 245 (1958).

MAURICE A. BRINDISI, *Primary Examiner.*